US006987762B2

(12) United States Patent
Shiota

(10) Patent No.: US 6,987,762 B2
(45) Date of Patent: Jan. 17, 2006

(54) PACKET EXCHANGE AND ROUTER AND INPUT PACKET PROCESSING METHOD THEREOF

(75) Inventor: Yoshiaki Shiota, Tokyo (JP)

(73) Assignee: NEC Corporation, Tokyo (JP)

(*) Notice: Subject to any disclaimer, the term of this patent is extended or adjusted under 35 U.S.C. 154(b) by 823 days.

(21) Appl. No.: 09/795,193

(22) Filed: Mar. 1, 2001

(65) Prior Publication Data

US 2001/0021189 A1 Sep. 13, 2001

(30) Foreign Application Priority Data

Mar. 2, 2000 (JP) ........................................ 2000/061806

(51) Int. Cl.
 H04L 12/28 (2006.01)
 H04L 12/56 (2006.01)

(52) U.S. Cl. ................... 370/389; 370/401; 370/469; 370/395.32

(58) Field of Classification Search ........... 370/389, 370/392, 465, 466, 467, 469, 474, 471, 349, 370/229, 235, 395.31, 395.32, 395.5, 419, 370/463, 475
See application file for complete search history.

(56) References Cited

U.S. PATENT DOCUMENTS

| 6,529,958 B1 * | 3/2003 | Oba et al. .................... 709/237 |
| 6,683,865 B1 * | 1/2004 | Garcia-Luna-Aceves et al. ........................... 370/349 |
| 6,693,878 B1 * | 2/2004 | Daruwalla et al. .......... 370/235 |
| 6,697,329 B1 * | 2/2004 | McAllister et al. ......... 370/235 |
| 6,711,152 B1 * | 3/2004 | Kalmanek et al. .......... 370/351 |
| 6,731,644 B1 * | 5/2004 | Epps et al. .................. 370/412 |

FOREIGN PATENT DOCUMENTS

| JP | 4-216241 A | 8/1992 |
| JP | 08-510102 | 10/1996 |
| JP | 9-238140 A | 9/1997 |
| JP | 10-257066 A | 9/1998 |
| WO | WO 97/13353 A1 | 4/1997 |

OTHER PUBLICATIONS

Geng–Seng Kuo, "Multiprotocol Label Switching", *IEEE Communications Magazine*, Dec. 1999, p. 36.
Tony Li, "MPLS and the Evolving Internet Architecture", *IEEE Communications Magazine*, Dec. 1999, pp. 38–68.

\* cited by examiner

*Primary Examiner*—Brian Nguyen
(74) *Attorney, Agent, or Firm*—Sughrue Mion, PLLC

(57) ABSTRACT

The present invention is provided with a pipeline for performing in a conveyor-belt style, the processing of obtaining the necessary information for performing an operation after judging the operation to be performed, of the Swap, the Push, and the Pop, and obtaining the output channel information, based on the content of the shim header of the MPLS packet and the information set in advance. The header controller sequentially supplies a top shim header of each packet received from a plurality of lines to the pipeline and performs an actual operation on the top shim header of each packet, based on the obtained information. As the result of the pop operation, when there exists a shim header that becomes a top newly, it repeats the above processing starting from a stage of supplying the shim header of the new top to the pipeline again. Namely, the pop processing of the MPLS packet is not collectively performed at once but performed by looping the pipeline.

9 Claims, 13 Drawing Sheets

PACKET EXCHANGE AND ROUTER AND INPUT PACKET PROCESSING METHOD THEREOF

BACKGROUNDS OF THE INVENTION

1. Field of the Invention

The present invention relates to a packet exchange and a router, and more particularly it relates to a packet exchange and a router and an input packet processing method thereof characterized by the processing such as supplying a packet received from a line, to the switch through the line cards, in a packet exchange formed by a plurality of line cards and a switch.

2. Description of the Related Art

With the spread of Internet, there arises such a problem that traffic on an IP (Internet protocol) network is so much increased that the conventional IP router is difficult to carry data efficiently and to maintain the quality of service. As a communication method in order to solve this problem, there is an MPLS (Multi Protocol Label Switching) method.

The technique of the MPLS method is described in, for example, IEEE COMMUNICATIONS MAGAZINE, VOL. 37, NO. 12, DECEMBER, 1999, pp. 36–68.

In the MPLS, an IP packet having the format as shown in FIG. 3(A) is encapsulated by the data called a shim header as shown in FIG. 3(B). Within a shim header, there exists a label that is an identifier indicating the routing information as shown in FIG. 3(C). Provided with a 20-bit long field, this label can distinguish 1,000,000 incoming packets. An MPLS packet can adopt a hierarchical structure with a plurality of shim headers attached as shown in FIG. 3(D), which is called label stacking. An LSR (Label Switch Router) performs routing and switching processing on an MPLS packet having arrived there based on the label and transfers the packet to an adjacent router.

Further, the packet is encapsulated by a PPP packet defined by, for example, RFC 1661 of IETF and transferred to and from a line. The PPP can carry an IP packet and an MPLS packet, and upon receipt of the PPP packet, the LSR judges whether the received packet is an IP packet or an MPLS packet. A control signal for setting label information on the LSR is served by using an LDP (Label Distribution Protocol) which employs a TCP on an IP packet not on an MPLS packet as a transport layer.

There are three kinds of LSRs, respectively called Ingress Edge-LSR, Core LSR, and Egress Edge-LSR. The Ingress Edge-LSR classifies IP packets received from a line into specified combinations based on each source address and destination address within IP headers. This is referred to as classification into FEC (Forwarding Equivalence Class). The Ingress Edge-LSR determines whether MPLS should be performed on the IP packet group classified into this FEC or not, and if necessary, it changes the same into MPLS packets and transfers them to an adjacent LSR. The Core LSR relays the MPLS packets. At the relay, the Core LSR performs the processing such as swapping the label of an incoming packet with the label for outgoing (referred to as a Swap, and only the label within a shim header is swapped), adding a new shim header to a packet (referred to as a Push), and removing a leading shim header (it may be a plurality of shim headers) from a packet (referred to as a Pop), and transfers the processed packets to an adjacent LSR. The Egress Edge-LSR removes each label from the top of the incoming packets, changes them into the IP packets, and transfers the same packets to an adjacent IP router by the IP routing.

In the MPLS packet processing procedure by the LSR, when an MPLS packet arrives at a line input interface, the LSR refers to a table called ILM (Incoming Label Map), with a label within the shim header of the incoming packet used as a key. The ILM includes pointers, indicating a table describing which kind of label operation should be performed on some input label, which is called NHLFE (Next Hop Label Forwarding Entry). The routing processing is performed based on the NHLFE. Thereafter, the LSR performs switching processing therein and sends the packets from a line output interface to an adjacent LSR and IP router. The Ingress Edge-LSR pushes a label on a packet requiring the MPLS, of the IP packet group classified into the FEC, after referring to the NHLFE. Although the operation by use of the ILM and the NHLFE is defined in the IETF draft specification (where the architecture of the MPLS is defined), the installation thereof is not defined.

As the existing installation method of an exchange or a router, there is a method of forming an exchange or a router with a plurality of line cards and a switch card. Generally, a line card can be provided with a plurality of lines, and the communication band of one line card is predetermined in advance. For example, in the case of the band of 2.4 Gbps (Giba Bit Per Sec), a line of the transfer rate 2.4 Gbps could hold one line and a line of the transfer rate 155 Mbps (Mega Bit Per Sec) could hold 16 lines. Here, the MPLS can hold a label space per each line. Therefore, the same label value may be used in different lines. If an identifier bit for discriminating each input line is added to the 20-bit label on the line cards in order to identify a label for each line, 24 bits becomes necessary as a reference key of the ILM when one line card holds 16 lines. Then, it becomes possible to discriminate 16,000,000 incoming packets.

On the other hand, in a design of a system, it is difficult to use as many as 16,000,000 identifiers at once for the reason of restriction of a memory and complication of management, and the number of the identifiers of the incoming packets to be used is restricted. In the MPLS, this is realized by restricting the number of the pointers indicated by the ILM to the number usable by a system.

Assuming that the number of the identifiers usable by one line card is 64,000, the pointer belonging to each entry of the ILM is two bites (16 bits). In order to provide a system with the ILM having the above 24 bits as an address for gaining access to a memory, the memory amount of 32 Mega bites is necessary. However, since the area actually used is 128 kilo bites (64,000×2 bites), almost all the areas of a memory become useless.

The conventional technique for discriminating input labels as the above is disclosed in Japanese Patent Laid-Open No. 8-510102, "Label Processing within Packet Network". In this technique, assuming that an input label is formed by a first portion and a second portion being fixed previously, an exchange can perform the identification processing on the incoming packets in the three modes of: (1) the labels of the first portion and the second portion, (2) only the label of the first portion, and (3) only the label of the second portion. This technique, however, has no consideration of the input line number. When an input label of the above mode (2) corresponding to the MPLS is formed by only the first portion, the input label is used as an address for memory access in searching a table corresponding to the first portion. In this method, however, when the bit length of the first portion is long like the MPLS label, there is a problem such as requiring a large amount of memory as mentioned above, and an efficient use of a memory is impossible.

On the other hand, as the result of referring to the ILM and NHLFE, the MPLS packet which needs the pop processing removes one label from the head of the label stack. As the result of the pop processing, there are one case of returning to an IP packet and another case of remaining as an MPLS packet. The case of returning to an IP packet means that the LSR is the Egress Edge-LSR, and thereafter the above-mentioned IP routing processing is performed. In the case of remaining as the MPLS packet, it is necessary to do the label processing again by reference to the ILM and the NHLFE. This pop processing may be done several times in some cases. A system needs to cope with the repetition of this pop processing, which makes the system complicated and deteriorate in the performance. For example, in the method in which the next packet is not processed until the whole processing as for one packet is completed, if two pop processing is generated, a packet arriving at later may be delayed by one packet processing, compared with the case of not generating two pops. Therefore, when receiving a plurality of packets to be subjected to two and more pop processing, the number of the packets in the wait state is increased and there is a fear of falling into a situation of abandoning packets necessarily without processing.

As described in the above, the LSR needs not only an MPLS packet but also an IP packet processing including routing, and a method of integrating the both MPLS and IP processing for efficient and rapid processing is required.

SUMMARY OF THE INVENTION

An object of the present invention is to provide a packet exchange and a router and an incoming packet processing method thereof in which a packet to be subjected to several pop processing never affects a packet arriving at later, and delays its processing start.

Another object of the present invention is to provide a packet exchange and a router and an incoming packet processing method thereof capable of efficient use of a memory and rapid ILM search processing.

Further another object of the present invention is to provide a packet exchange and a router and an incoming packet processing method thereof improved in efficiency and speed by integrating the both MPLS and IP processing.

According to the first aspect of the invention, a router for performing transfer processing based on a label of a header added to a protocol packet having the header that can be stacked with a plurality of layers, comprises.

a pipeline for performing in a conveyor-belt style the processing of obtaining necessary information for performing the operation after judging the type of an operation to be performed on a label and obtaining output channel information, based on the content of the header of a packet and information set in advance, and a means of sequentially supplying a top header of each packet received from a line to the pipeline, performing an actual operation on the top header of each packet, based on the obtained information, and as the result of pop processing, repeating the above processing starting from a stage of supplying a new top header to the pipeline as for a packet including the new top header.

In the preferred construction, the packet is an MPLS packet and the header is a shim header.

In another preferred construction, the pipeline obtains necessary information for performing the operation by reference to a header processing table including a first table describing which kind of operation to be performed on a label and a second table for searching for a pointer of a corresponding entry of the first table.

In another preferred construction, the pipeline includes a means for searching the second table by a search key, which is defined by combining an input line number that has received a packet with a label within a top header, and the searching means is constituted in that: the search key is divided into n divided search keys from one to n; the second table is divided into a plurality of search tables from a first search table to n-th search table; the first divided search key is used for searching the first search table; the result obtained by searching the first search table is used as an upper key of a search key for searching the second search table, the second divided search key is used as a lower key, and a combined key of the upper key and the lower key is used as a key for searching the second search table; the result obtained by searching the (k−1)-th (k is an integer from one to n) search table is used as an upper key for searching the k-th search table, the k-th divided search key is used as a lower key, and a combined key of the upper key and the lower key is used for searching the k-th search table; and the result obtained by searching the n-th search table becomes a pointer for gaining access to the first table.

According to the second aspect of the invention, a router for performing transfer processing of a first protocol packet, based on a label of a first header added to the first protocol packet having the first header that can be stacked with a plurality of layers, as well as performing transfer processing of a second protocol packet, based on a label of a second header added to a second protocol packet having the second header that can be stacked with a plurality of layers, comprises a first pipeline for performing in a conveyor-belt style, the processing of obtaining necessary information for performing the operation after judging the type of an operation to be performed on a label and obtaining output channel information, based on the content of the first header and information previously set, and hence supplying a processed result in a predetermined format, a second pipeline for performing in a conveyor-belt style, the processing of obtaining necessary information for performing the operation after judging whether the second protocol packet needs to be changed into the first protocol packet or not, based on the content of the second header and information previously set and obtaining output channel information, and hence supplying a processed result in the above format, and a means of judging the protocol of a packet received from a plurality of lines, sequentially supplying a top header of each packet received from the lines to the first pipeline if the packet is of the first protocol, performing an actual operation on the top header of each packet based on the obtained information, and as the result of the pop operation, repeating the above processing starting from a stage of supplying a new top header to the first pipeline, as for a packet including the new top first header, while if the packet is of the second protocol, sequentially supplying the header of each packet received from the lines to the second pipeline and performing an actual operation on each packet based on the obtained information.

In the preferred construction, the first protocol packet is an MPLS packet, the first header is a shim header, the second protocol packet is an IP packet, and the second header is an IP header and a TCP/UDP header.

According to the third aspect of the invention, a packet exchange for performing transfer processing based on a label of a header added to a protocol packet having the header that can be stacked with a plurality of layers, comprises a pipeline for performing in a conveyor-belt style, the processing of obtaining necessary information for performing the operation after judging the type of an operation to be performed on a label and obtaining output channel information, based on the content of the header of a packet and information set in advance, and a means of sequentially supplying a top header of each packet received from a line to the pipeline, performing an actual operation on the top header of each packet, based on the obtained information, and as the result of pop processing, repeating the above processing starting from a stage of supplying a new top header to the pipeline, as for a packet including the new top header.

In the preferred construction, the packet is an MPLS packet and the header is a shim header.

In another preferred construction, the pipeline obtains necessary information for performing the operation by reference to a header processing table including a first table describing which kind of operation to be performed on a label and a second table for searching for a pointer of a corresponding entry of the first table.

In another preferred construction, the pipeline includes a means for searching the second table by a search key, which is defined by combining an input line number that has received with a label within a top header, and the searching means is constituted in that: the search key is divided into n divided search keys from one to n; the second table is divided into a plurality of search tables from a first search table to n-th search table; the first divided search key is used for searching the first search table; the result obtained by searching the first search table is used as an upper key of a search key for searching the second search table, the second divided search key is used as a lower key, and a combined key of the upper key and the lower key is used as a key for searching the second search table; the result obtained by searching the (k−1)-th (k is an integer from one to n) search table is used as an upper key for searching the k-th search table, the k-th divided search key is used as a lower key, and a combined key of the upper key and the lower key is used for searching the k-th search table; and the result obtained by searching the n-th search table becomes a pointer for gaining access to the first table.

According to the fourth aspect of the invention, a packet exchange for performing transfer processing of a first protocol packet, based on a label of a first header added to the first protocol packet having the first header that can be stacked with a plurality of layers, as well as performing transfer processing of a second protocol packet, based on a label of a second header added to a second protocol packet having the second header that can be stacked with a plurality of layers, comprises a first pipeline for performing in a conveyor-belt style, the processing of obtaining necessary information for performing the operation after judging the type of an operation to be performed on a label and obtaining output channel information, based on the content of the first header and information previously set, and hence supplying a processed result in a predetermined format, a second pipeline for performing in a conveyor-belt style, the processing of obtaining necessary information for performing the operation after judging whether the second protocol packet needs to be changed into the first protocol packet or not, based on the content of the second header and information previously set and obtaining output channel information, and hence supplying a processed result in the above format, and a means of judging the protocol of a packet received from a plurality of lines, sequentially supplying a top header of each packet received from the lines to the first pipeline if the packet is of the first protocol, performing an actual operation on the top header of each packet based on the obtained information, and as the result of the pop operation, repeating the above processing starting from a stage of supplying a new top header to the first pipeline, as for a packet including the new top first header, while if the packet is of the second protocol, sequentially supplying the header of each packet received from the lines to the second pipeline and performing an actual operation on each packet based on the obtained information.

In the preferred construction, the first protocol packet is an MPLS packet, the first header is a shim header, the second protocol packet is an IP packet, and the second header is an IP header and a TCP/UDP header.

According to another aspect of the invention, an input packet processing method in a packet exchange or a router for performing transfer processing based on a label of a header added to a protocol packet having the header that can be stacked with a plurality of layers, comprises the steps of a pipeline processing step of performing in a conveyor-belt style, the processing of obtaining necessary information for performing the operation after judging the type of an operation to be performed on a label and obtaining output channel information, based on the content of the header of a packet and information set in advance, and a step of sequentially supplying a top header of each packet received from a line to the pipeline, performing an actual operation on the top header of each packet, based on the obtained information, and as the result of pop processing, repeating the above processing starting from a stage of supplying a new top header to the pipeline, as for a packet including the new top header.

In the preferred construction, the packet is an MPLS packet and the header is a shim header.

In another preferred construction, the pipeline processing step including a step of obtaining necessary information for performing the operation by reference to a header processing table including a first table describing which kind of operation to be performed on a label and a second table for searching for a pointer of a corresponding entry of the first table.

In another preferred construction, the pipeline processing step being formed by a step of searching the second table by a search key, which is defined by combining an input line number that has received a packet with a label within a top header; dividing the search key into n divided search keys from one to n; dividing the second table into a plurality of search tables from a first search table to n-th search table; using the first divided search key for searching the first search table; using the result obtained by searching the first search table, as an upper key of a search key for searching the second search table, using the second divided search key as a lower key, and using a combined key of the upper key and the lower key as a key for searching the second search table; using the result obtained by searching the (k−1)-th (k is an integer from one to n) search table as an upper key for searching the k-th search table, using the k-th divided search key as a lower key, and using a combined key of the upper key and the lower key for searching the k-th search table; and thereby making the result obtained by searching the n-th search table as a pointer for gaining access to the first table.

According to a further aspect of the invention, an input packet processing method in a packet exchange or a router for performing transfer processing of a first protocol packet, based on a label of a first header added to the first protocol packet having the first header that can be stacked with a plurality of layers, as well as performing transfer processing of a second protocol packet, based on a label of a second header added to a second protocol packet having the second header that can be stacked with a plurality of layers, comprises the steps of a first pipeline processing step of performing in a conveyor-belt style, the processing of obtaining necessary information for performing the operation after judging the type of an operation to be performed on a label and obtaining output channel information, based on the content of the first header and information previously set, and hence supplying a processed result in a predetermined format, a second pipeline processing step of performing in a conveyor-belt style, the processing of obtaining necessary information for performing the operation after judging whether the second protocol packet needs to be changed into the first protocol packet or not, based on the content of the second header and information previously set and obtaining output channel information, and hence supplying a processed result in the above format, and a step of judging the protocol of a packet received from a plurality of lines, sequentially supplying a top header of each packet received from the lines to the first pipeline if the packet is of the first protocol, performing an actual operation on the top header of each packet based on the obtained information, and as the result of the pop operation, repeating the above processing starting from a stage of supplying a new top header to the first pipeline, as for a packet including the new top first header, while if the packet is of the second protocol, sequentially supplying the header of each packet received from the lines to the second pipeline and performing an actual operation on each packet based on the obtained information.

In the preferred construction, the first protocol packet is an MPLS packet, the first header is a shim header, the second protocol packet is an IP packet, and the second header is an IP header and a TCP/UDP header.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the below embodiment, the description will be made in the case of adopting the present invention to an LSR.

Figure 1:
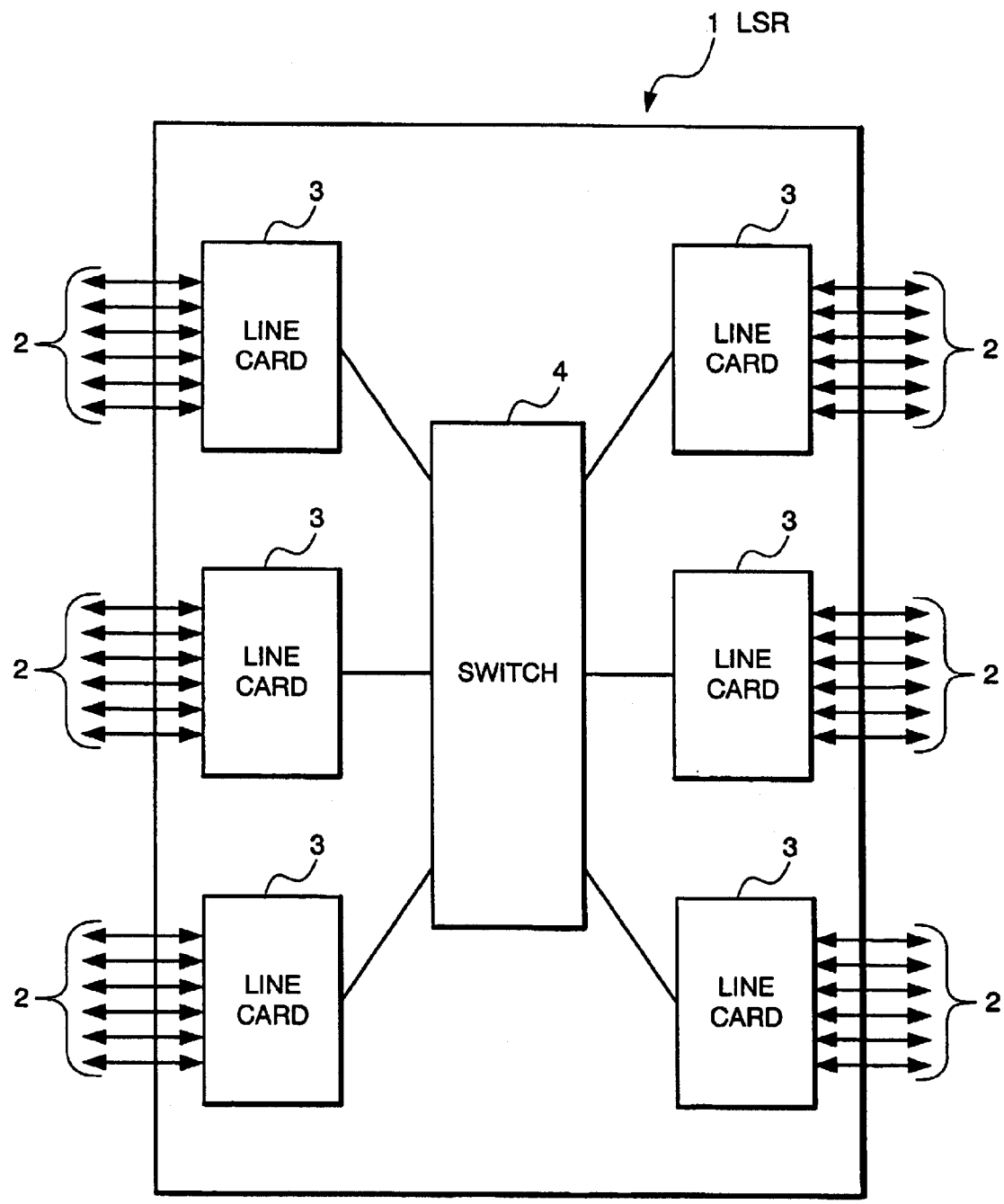
FIG. 1 is a block diagram of an LSR related to an embodiment of the present invention.

With reference to FIG. 1, an LSR 1 relative to the embodiment of the present invention is formed by a plurality of line cards 3 and a switch 4 connected to them. The respective line cards 3 hold a plurality of lines 2 each connected to an opposite device for PPP packets, and it is provided with a function of requiring the output channel information (which line of which line card to supply the data to) on the LSR 1 after performing the IP packet routing, the MPLS processing of an IP packet, and the label processing of an MPLS packet, so to supply the same information to the switch 4 and supplying packets to a corresponding line based on the output channel information, upon receipt of the packets from the switch 4. The switch 4 performs switching processing on the packets received from the respective line cards 3 based on the output channel information and supplies the same packets to the respective corresponding line cards 3. The LSR 1 is provided with all the LSR functions of Ingress, Core, and Egress. For example, a line of some line card 3 can be used for the Ingress LSR, and another line can be used for a general IP routing, and the like. Namely, the LSR can work also as an IP router.

Figure 2:
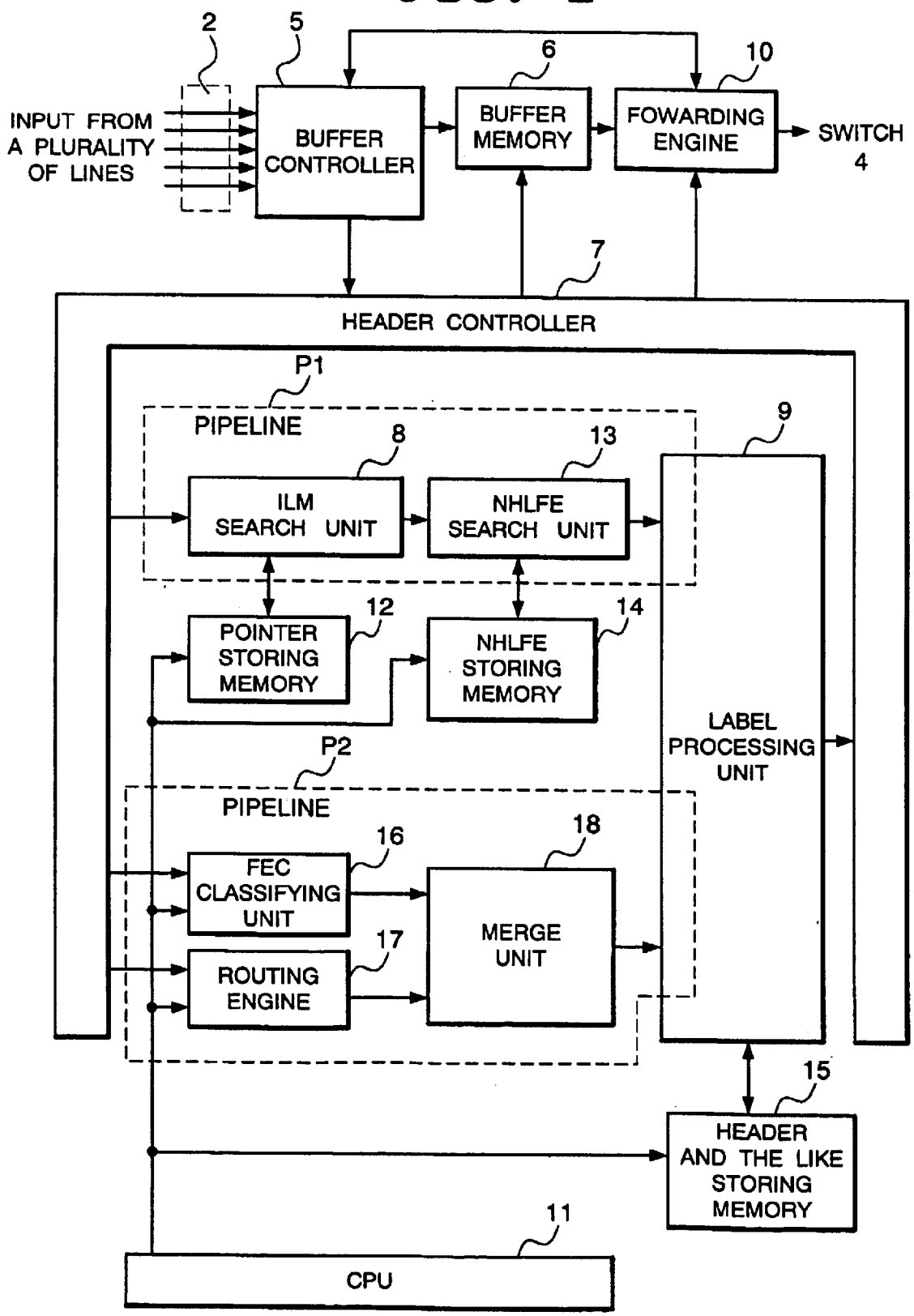
FIG. 2 is a block diagram at an input side from a line on a line card of the LSR.

FIG. 2 shows the whole of an input unit (the block where a packet received from a line is supplied to the switch 4) from a line on the line card 3. The input unit of this example includes a buffer controller 5, a buffer memory 6, a header controller 7, an ILM search unit 8, a label processing unit 9, a forwarding engine 10, a CPU 11, a pointer storing memory 12, an NHLFE search unit 13, an NHLFE storing memory 14, a header and the like storing memory 15, an FEC classifying unit 16, a routing engine 17, and a merge unit 18. The ILM search unit 8, the NHLFE search unit 13, and the label processing unit 9 form a pipeline P1 for MPLS processing and the FEC classifying unit 16, the routing engine 17, the merge unit 18, and the label processing unit 9 form a pipeline P2 for IP routing and for judgment on MPLS.

The CPU 11 sets each block within the line card 3 based on the information obtained by an operator and an autonomous working protocol and sets necessary data in the pointer storing memory 12, the NHLFE storing memory 14, the header and the like storing memory 15, the FEC classifying unit 16, and the routing engine 17. The output channel information used by the switch 4 and a shim header group to be pushed on the packets are stored in each entry of the header and the like storing memory 15. The NHLFE including each entry of label operation information, a new label to be swapped with, length of shim header to be pushed, the output channel information pointer used as an address for gaining access to the header and the like storing memory 15 is stored in the NHLFE storing memory 14. The ILM for holding each pointer to the entry of the NHLFE is stored in the pointer storing memory 12. A match condition of the FEC classification, the output channel information pointer (it is used as an address for gaining access to the header and the like storing memory 15) and the shim header length for every condition are set in the FEC classifying unit 16, and a routing table is set in the routing engine 17.

The buffer controller 5 writes the packets received from a plurality of lines 2 into the buffer memory 6 and simultaneously sends the header information (the IP header and the TCP/UDP header in the case of an IP packet, and all the shim header, the IP header, and the TCP/UDP header in the case of an MPLS packet) of the packets received from the lines, to the header controller 7, together with the input line number, while receiving the packets and extracting the header information therefrom. The buffer controller 5 controls non-used area within the buffer memory 6. The reason for sending only the header, not sending the whole packet to the header controller 7, is that only a reference to the header of a packet is sufficient for the MPLS label processing or the IP routing and the MPLS processing of the IP packet and that sending the whole packet is useless.

The header controller 7 sends the header information of a packet and the input line number to the ILM search unit 8, the FEC classifying unit 16, and the routing engine 17, and after receiving the notification of the completion of the header processing from the label processing unit 9, it performs the pop processing of the MPLS packet, a change of the data within the buffer memory 6, and a transfer request of the packet to the forwarding engine 10. The forwarding engine 10 transfers the packet having finished the header processing to the switch 4.

The ILM search unit 8 searches the ILM on the pointer storing memory 12 based on the header information, so to get a pointer for use in the NHLFE search unit 13. The NHLFE search unit 13 searches the NHLFE storing memory 14 based on the pointer, so to get the label processing information and a pointer for use in the label processing unit 9 and if necessary, to do the swap processing of the MPLS packet.

The FEC classifying unit 16 classifies the packets into the FEC (Forwarding Equivalence Classes) that is a set of the IP and TCP header information, and judges whether the MPLS should be performed on a packet. The routing engine 17 performs the routing of an IP packet. The merge unit 18 merges the result of the FEC classifying unit 16 with the result of the routing engine 17 and sends the same result to the label processing unit 9.

The label processing unit 9 gains access to the header and the like storing memory 15 to get the switching information such as a shim header to be pushed and an output channel, and notifies the result to the header controller 7.

Figure 3:
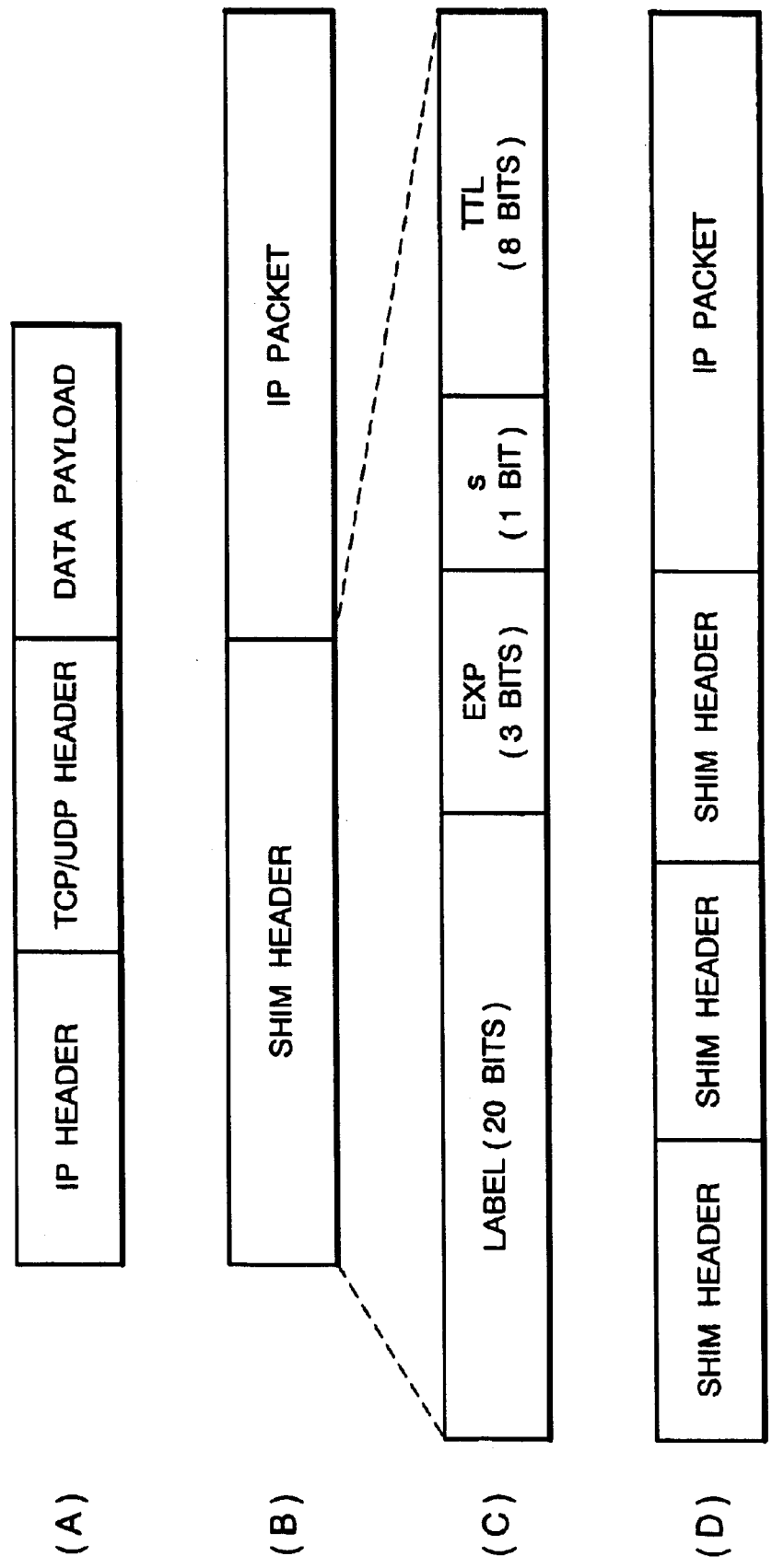
FIG. 3 is a view showing the format of the IP and MPLS packets received from a plurality of lines.

The format of a packet received from a plurality of lines 2 is shown in FIG. 3. This packet is actually encapsulated by the PPP packet. FIG. 3(A) shows an IP packet. FIG. 3(B) shows an MPLS packet. FIG. 3(C) shows the detail of the shim header of FIG. 3(B). FIG. 3(D) shows an example of the label stacked MPLS packet.

This time, more detailed structure and operation of the embodiment of the present invention will be described.

With reference to FIG. 2, a plurality of packets to be supplied from a plurality of lines 2 to the buffer controller 5 are written into the buffer memory 6 by the buffer controller 5 if there is enough space in the buffer memory 6 (if there is not enough space, they are abandoned by the buffer controller 5). At this time, when a shim header is pushed, since the shim header is added to the head of the packet having been written in the buffer memory 6, the packet must be written with some space provided in the head portion of the packet buffer, the space corresponding to the length of the shim header assumed. Simultaneously, the head address of the packet buffer, the header information and the input line number information of the packet are temporarily held within the buffer controller 5 together with the sequence number. At this time, the kind of the packet; either an IP packet or an MPLS packet, is judged.

Figure 4:
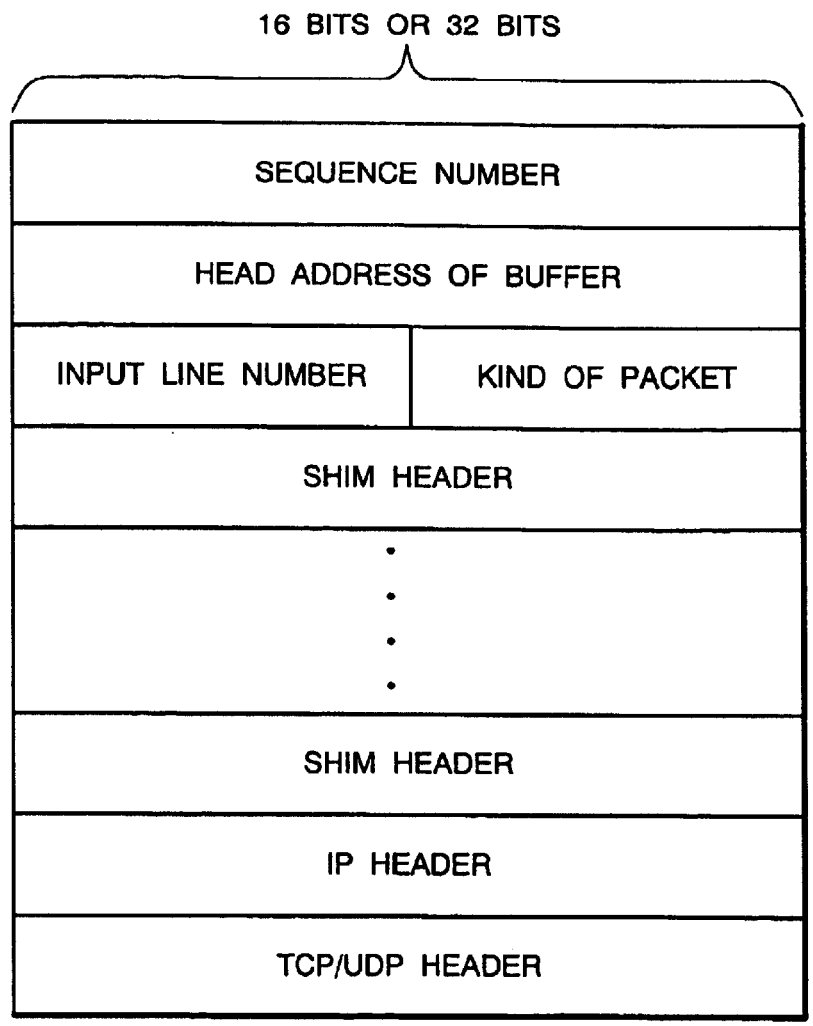
FIG. 4 is a view showing the format of the data to be sent to a header controller by a buffer controller.

Upon completion of receiving the header portions of the incoming packets, the buffer controller 5 sends the holding head address of the buffer, header information (the IP header and the TCP/UDP header in the case of an IP packet, and all the shim header, the IP header, and the TCP/UDP header in the case of an MPLS packet), input line number, kind of a packet, and sequence number, to the header controller 7. The format of the data to be sent to the header controller 7 is shown in FIG. 4. The sequence number is used for controlling a packet that has not finished transferring to the switch 4. The header controller 7 is sending a receive-enabling signal to the buffer controller 5, and the buffer controller 5 is in a position to send the data only when this enabling signal is active.

Upon completion of receiving the packets and writing them into the buffer memory 6, the buffer controller 5 checks a transfer error of each packet and if it is normal, it sends a processing start requesting signal to the header controller 7 and notifies the address within the buffer memory 6, which is storing the packet and the sequence number, to the forwarding engine 10. Upon completing a transfer of the header information and the like, the buffer controller 5 stores the sequence number and the buffer address of the packet stored in the buffer memory 6. If the result of the error check is abnormal, the buffer controller 5 instructs the head controller 7 through an abandonment requesting signal so as to abandon the handed header information.

Upon receipt of the processing starting request, the header controller 7 passes the header information, the input line number, and the sequence number to the ILM search unit 8 if the kind of the packet received from the buffer controller 5 is of the MPLS. If it is of the IP, it passes the same to the FEC classifying unit 16 and the routing engine 17. Here, the header controller 7 is subjected to a sending control through a receive-enabling signal from the respective units 8, 16, and 17. The header controller 7 preserves the information received from the buffer controller 5 (FIG. 4) until it makes a packet sending request to the forwarding engine 10.

Here, the operation of the header controller 7 sending information to the ILM search unit 8 to the operation of the label processing unit 9 described later is performed in the pipeline processing by the pipeline P1. For example, the ILM search unit 8 can receive the next packet header from the header controller 7 as soon as finishing the ILM processing and sending the result to the NHLFE search unit 13. As soon as the NHLFE search unit 13 sends the processing result to the label processing unit 9, it can receive the next data from the ILM search unit 8. Similarly, the operation of the header controller 7 sending information to the FEC classifying unit 16 and the routing engine 17 to the operation of the label processing unit 9 described later is performed in the pipeline processing by the pipeline P2. For example, as soon as the FEC classifying unit 16 and the routing engine 17 send the processing result to the merge unit 18, they can receive the next packet header from the header controller 7. As soon as the merge unit 18 sends the processing result to the label processing unit 9, it can receive the next data from the FEC classifying unit 16 and the routing engine 17. The processing time by both the pipelines P1 and P2 is defined as the same and the processing by both the pipelines P1 and P2 join with each other in the label processing unit 9.

Figure 5:
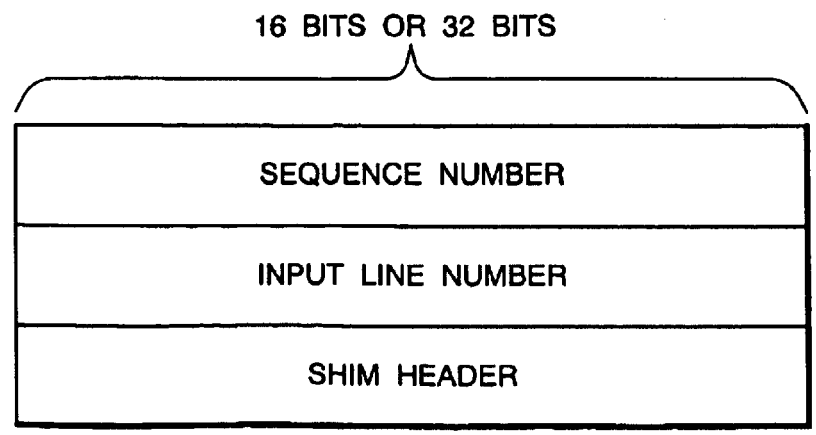
FIG. 5 is a view showing the format of the data to be handed to the ILM search unit by the header controller.
Figure 6:
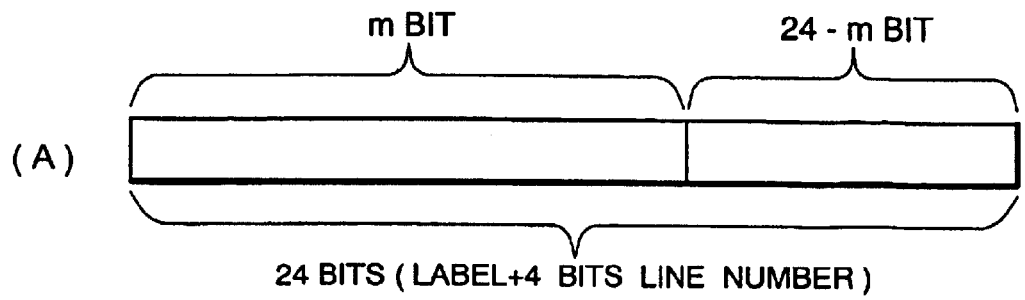
FIG. 6 is a view for use in describing a search key used in the ILM search unit.
Figure 6:
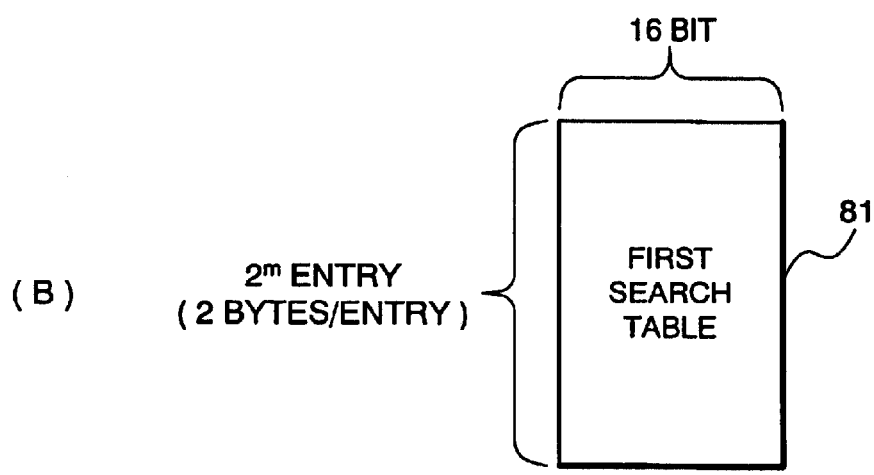
Figure 6:
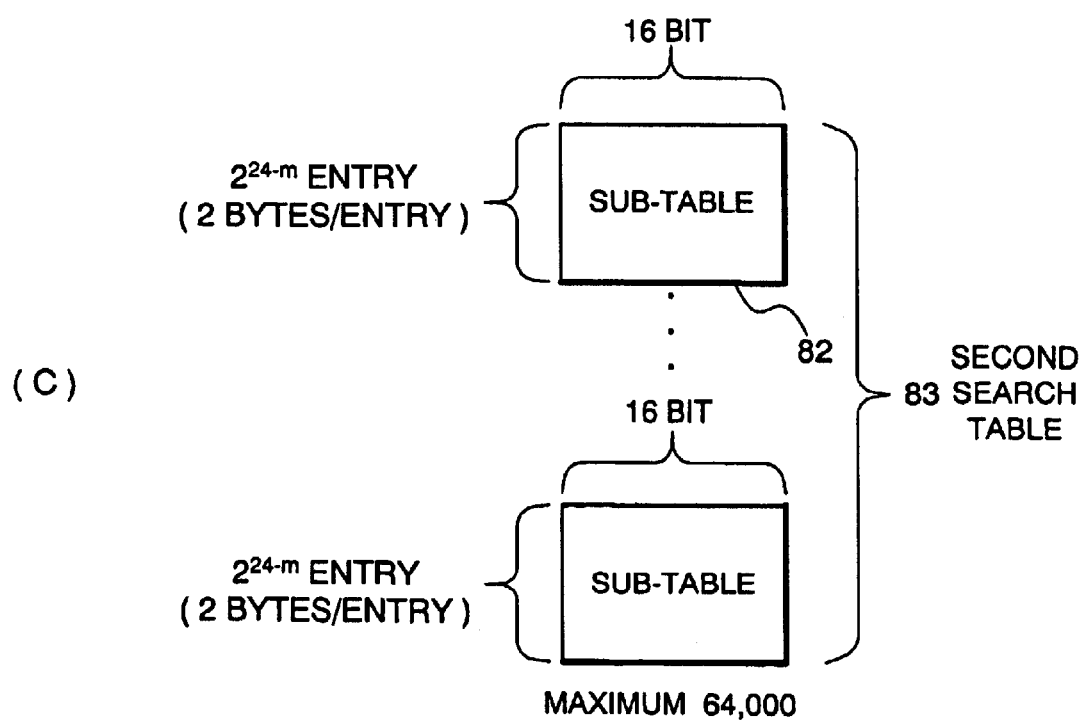
Figure 7:
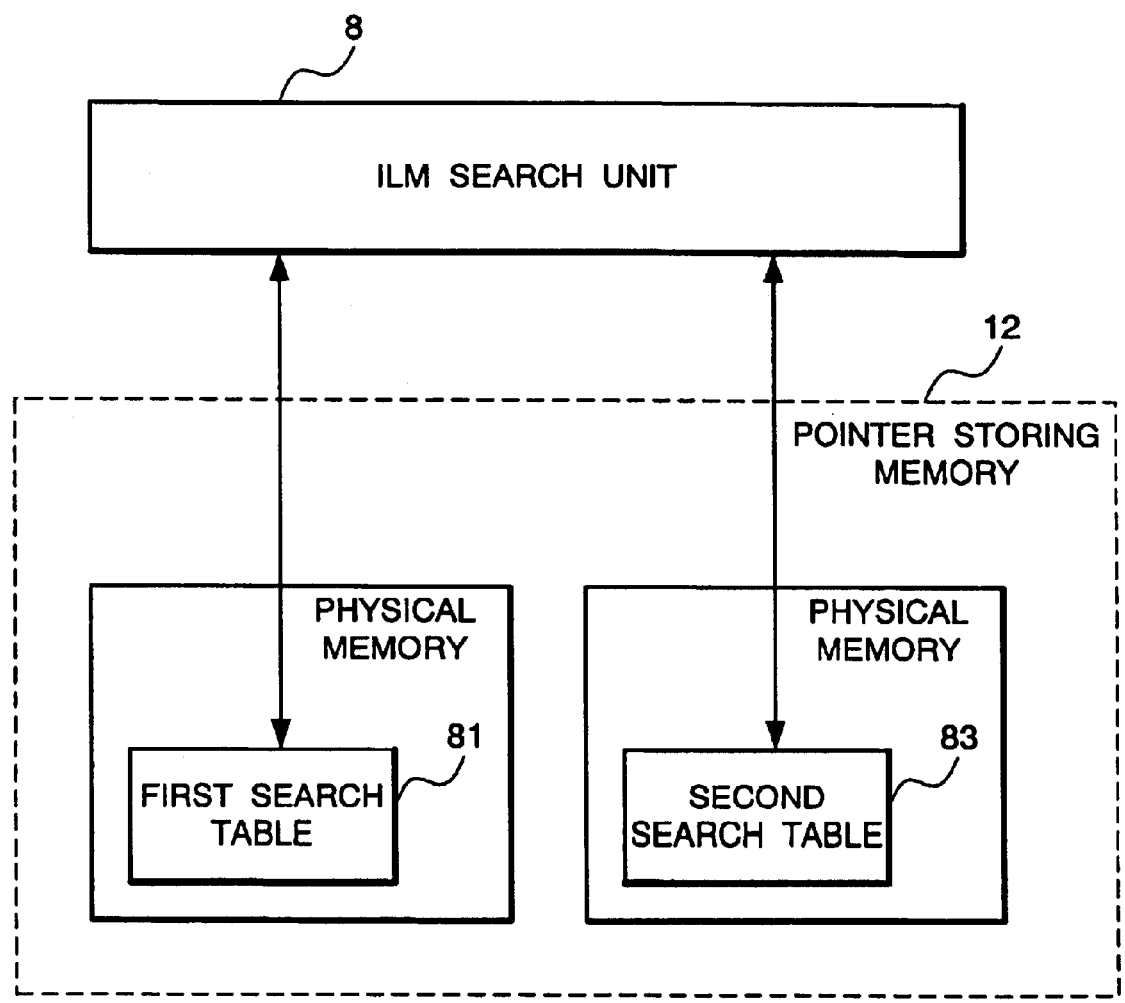
FIG. 7 is a view showing the physical structure of a pointer storing memory.

The structure of the data passed to the ILM search unit 8 by the header controller 7 is shown in FIG. 5. Even in the case of the MPLS packet of multiple layers by a plurality of shim headers, the shim header to be passed is only the top of them. For example, in the case where the number of lines held by a line card is 16, the input line number information becomes four bits (two to the fourth power=16), which is added to 20 bits of the label, to total up to the data of 24 bits (ILM search key). In the ILM search unit 8, this ILM search key and the search table are divided into a plurality of blocks, hence to search the ILM. FIG. 6(A) shows, by way of example, the case of dividing into two blocks. A key of 24 bits is divided into blocks of m bit and 24-m bit, which are respectively defined as a first divided search key and a second divided search key. Further, a second search table 83 formed by a first search table 81 and a plurality of sub-tables 82 as shown in FIGS. 6(B) and (C) is prepared. The content of the first search table 81 is a collection of pointers for gaining access to a sub-table 82 of the second search table 83, and the content of the second search table 83 is a collection of pointers for use in the NHLFE search unit 13 in the next stage. The first and the second search tables 81 and 83 are stored within the pointer storing memory 12. The respective tables 81 and 83 are put on the separate physical memories as shown in FIG. 7, and the respective physical memories are arranged in parallel to the ILM search unit 8, which enables simultaneous access. Needless to say, both the tables may be put on the same memory. When priority is given to processing speed, they should be arranged on the separate physical memories.

The first search table 81 contains entries of two to m-th power as shown in FIG. 6(B). When the number of input labels (including input line number) distinguishable by the line cards 3 is restricted to 64,000 (of 16,000,000), each entry contains two bites (16 bits) pointer (two to 16-th power=65536). Namely, the entry itself is two to m-th power, and the number of pointers is two to 16-th power at maximum. The ILM search unit 8 gains access to the first search table 81 put on the pointer storing memory 12 with 2×first divided search key as the address, so to get the pointer of two bites. Continuously, it merges this pointer with the second divided search key that is the remaining data block of 2-m bit (the pointer is at the upper bit side). The ILM search unit 8 gains access to the second search table 83 put on the pointer storing memory 12 with this result as the address, so to get the pointer of two bits used in the NHLFE search unit 13. As shown in FIG. 6(C), the second search table 83 is formed by the collection of 64,000 sub-tables 82 at maximum and each sub-table 82 has two to (2-m)-th power of entries.

The ILM search unit 8 having obtained the pointer sends the pointer, the sequence number and the shim header received from the header controller 7, to the NHLFE search unit 13. In the above, a change in the value of m will vary the total use amount of the memory of the ILM. The total memory amount can be expressed by the following expression 1.

$$2(2^m + 2^{(24-m)} \times 64000) \text{ bytes} \qquad \text{(Expression 1)}$$

In the expression 1, when m=20, the memory amount becomes minimum (the first search table and the second search table are respectively one mega bite, and two mega bites in total). Therefore, a memory having the volume of one mega bite and the more should be prepared in each physical memory. Compared with the method of the ILM search that uses 24 bits of the label and the input line number as the address for gaining access to a memory, the necessary memory amount is $1/16$.

Although the case of dividing into two has been described in the above, dividing into further can decrease the using memory amount more.

For example, when dividing into n, the ILM search key is divided into n divided search keys, from one to n, and the search table is divided into a plurality of search tables from one to n. The first divided search key is used for searching the first search table, the result obtained by searching the first search table is used as an upper key of the search key for searching the second search table, and the second divided search key is used as a lower key. The key obtained by combining the upper key and the lower key is used for searching the second search table, the result obtained by searching the (k−1)-th (k is integer from 1 to n) search table is used as an upper key of the search key for searching the k-th search table, and the k-th divided search key is used as a lower key. The key obtained by combining the upper key and the lower key is used for searching the k-th search table. Finally, the result obtained by searching the n-th search table is the pointer used in the NHLFE search unit 13. The total memory amount can be expressed by the following expression 2, assuming that the bit width of the k-th divided search key is kj.

$$2\{(2^{k_1} + 64000(2^{k_2} + \ldots + 2^{k_n}))\} \text{bytes} \qquad \text{(Expression 2)}$$

When the number of search keys divided is decided, the value of kj minimizing the result of the expression 2 is required. Therefore, the concrete number of division can be decided by requiring the memory amount which can be installed in a device and requiring the number of search keys divided which can satisfy this memory amount, and the bit width of each divided search key by using the expression 2.

Figure 8:
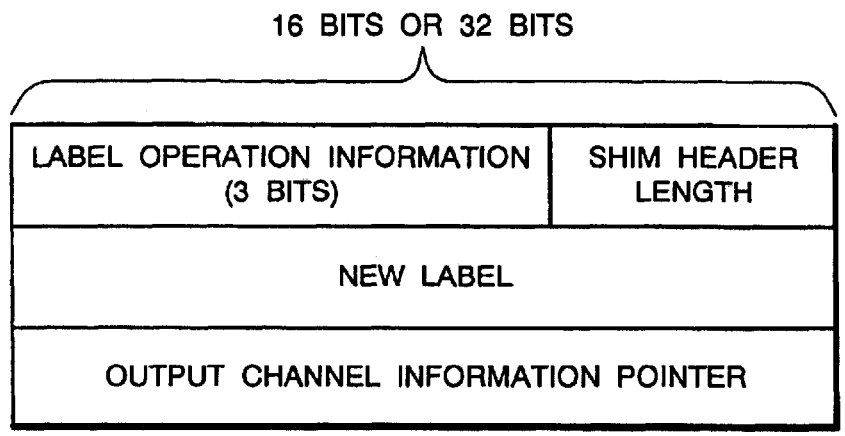
FIG. 8 is a view showing the format of the data to be obtained from the NHLFE storing memory by the NHLFE search unit.
Figure 9:
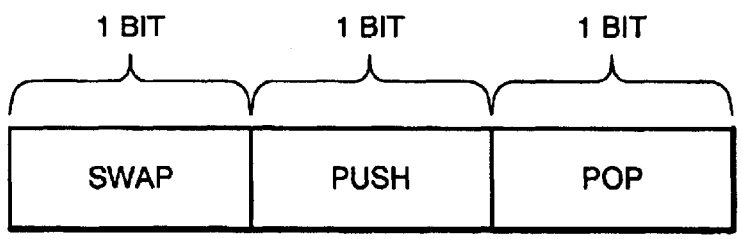
FIG. 9 is a view showing the detailed label operation information within the data of FIG. 8.

This time, the NHLFE search unit 13, upon receipt of the pointer, the shim header, and the sequence number from the ILM search unit 8, gains access to the NHLFE storing memory 14 with the received pointer as the address, so to get the label operation information describing which operation to do, of the label operations; swap, push, and pop, a new label to be swapped with, the length of a shim header to be pushed, and the output channel information pointer (which becomes an address of the header and the like storing memory 15) used by the label processing unit 9. The format of the information is shown in FIG. 8. The label operation information is formed by totally three bits, each one bit indicating the possibility of swap, push, and pop as shown in the format of FIG. 9. Next, when the swap bit of the label operation information is active, the label within the shim header received from the ILM search unit 8 is swapped with the obtained new label. Even when the push bit and the pop bit of the label operation information are active, the push processing and the pop processing are not performed in the NHLFE search unit 13, but later the push processing is performed in the label processing unit 9 and the pop processing is performed in the header controller 7 respectively.

Figure 10:
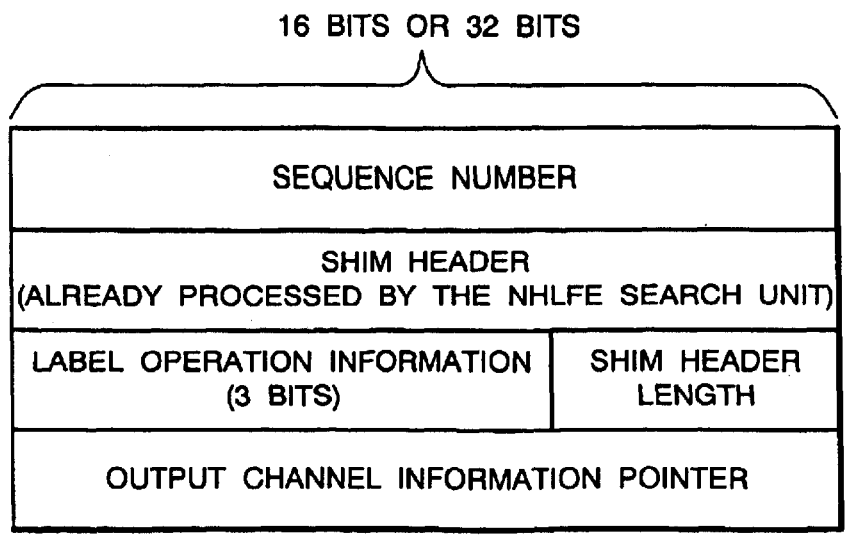
FIG. 10 is a view showing the format of the data to be sent to the label processing unit by the NHLFE search unit.

Finally, the NHLFE search unit 13 sends each data of the shim header, the output channel information pointer, the label operation information, the shim header length, and the sequence number to the label processing unit 9. The format of this sending data is shown in FIG. 10. The NHLFE search unit 13 is subjected to a sending control by a receive-enabling signal from the label processing unit 9.

Figure 11:
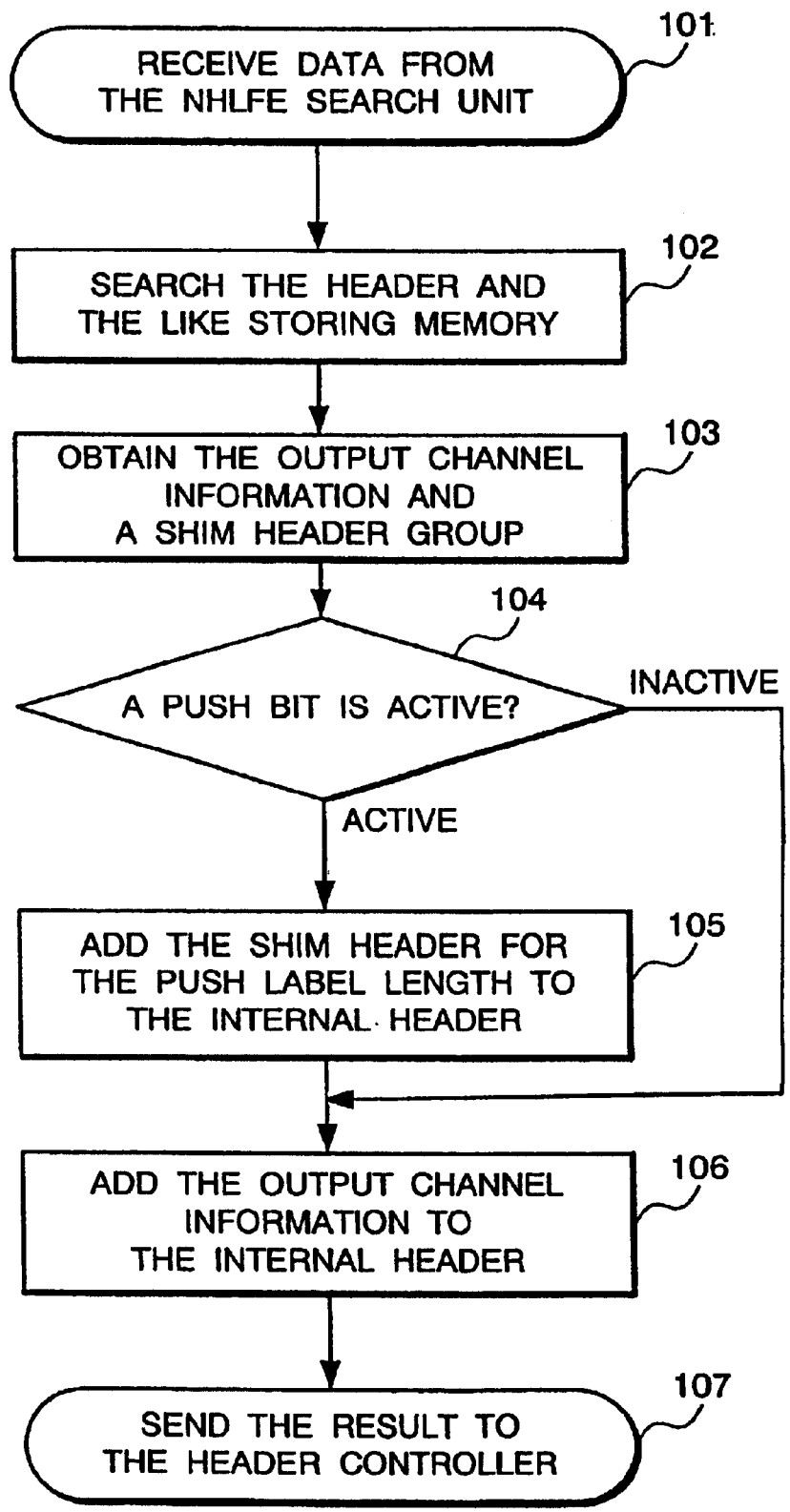
FIG. 11 is a flow chart of the MPLS packet processing of the label processing unit.
Figure 12:
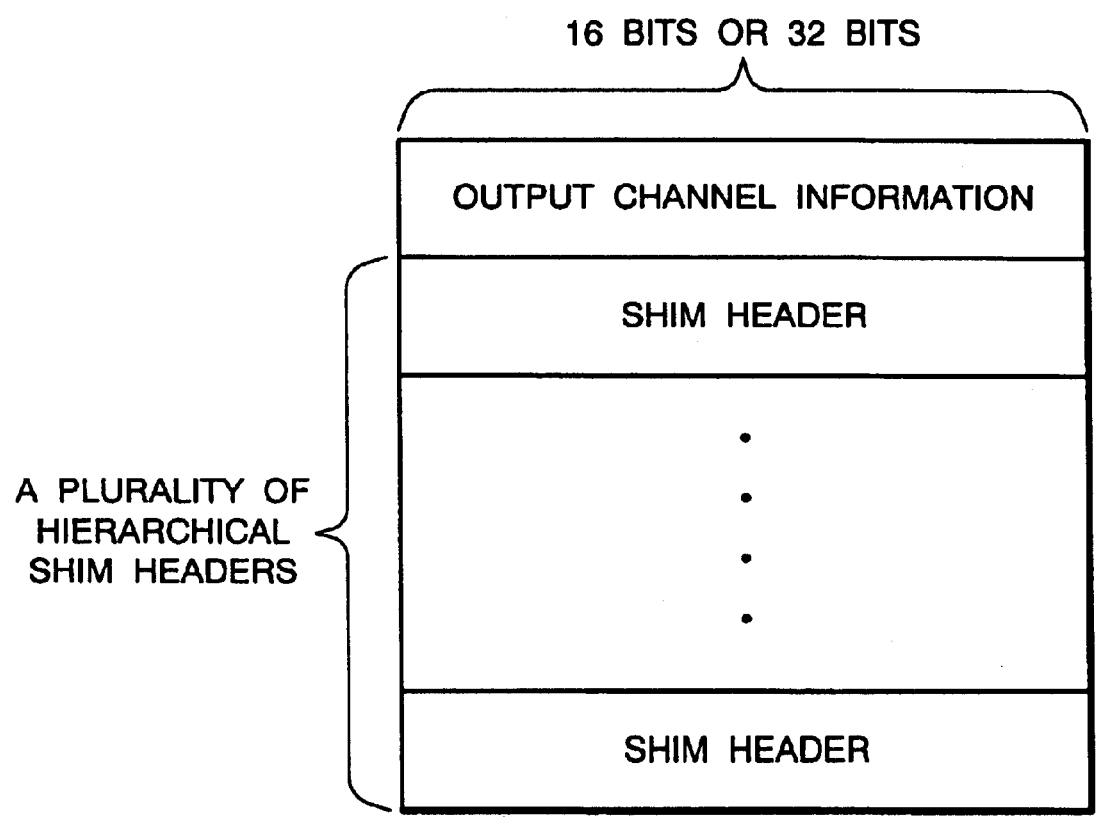
FIG. 12 is a view showing the format of the data to be obtained from the header storing memory by the label processing unit.
Figure 13:
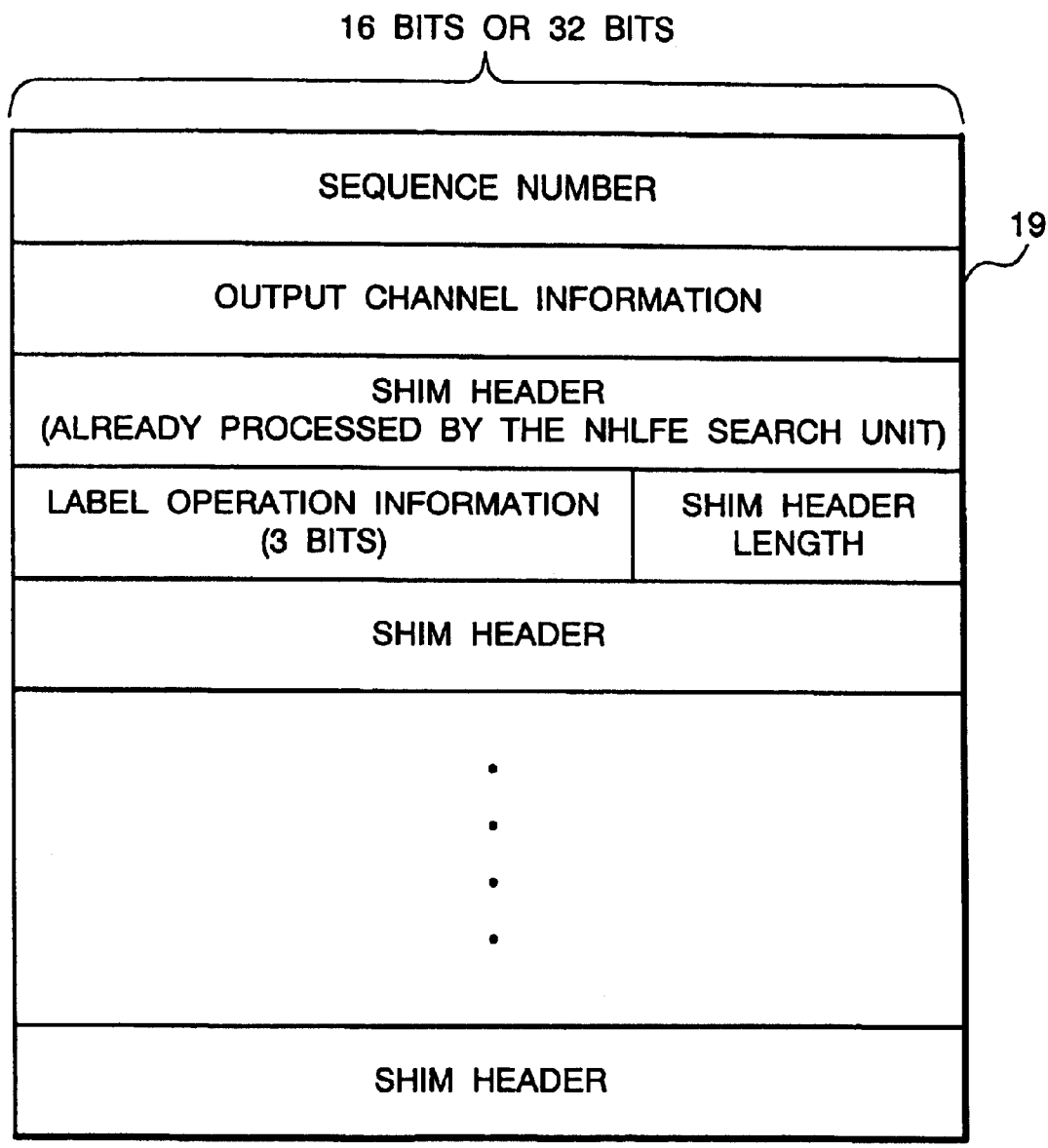
FIG. 13 is a view showing the format of the data to be sent to the header controller by the label processing unit.

FIG. 11 shows the operation of the label processing unit 9 toward an MPLS packet. The label processing unit 9 gains access to the header and the like storing memory 15 with the output channel information pointer received from the NHLFE search unit 13 as the address (101, 102). As the result, the output channel information used by the switch 4 and the shim header group to be pushed on the packets are obtained (103). This data format is shown in FIG. 12. The number of shim headers included in the shim header group read from the header and the like storing memory 15 is constant independent of the packets. The number of shim headers to be pushed actually is determined depending on the value of the shim header length supplied from the NHLFE search unit 13. Next, the label processing unit 9 adds the shim headers for the number written in the shim header length information to the internal held header (indicating the shim header received from the NHLFE search unit 13) if a push bit flag of the label operation information stands (104, 105). If a push bit flag doesn't stand, it adds nothing and neglects the obtained shim header group. In either case, the output channel information is added to the internal held header (106). Finishing the processing, the label processing unit 9 sends the internal held header and the label processing operation information, the shim header length, the output channel information, and the sequence number to the header controller 7 (107). This data format is shown in FIG. 13. The label processing unit 9 is subjected to a sending control by means of a receive-enabling signal from the header controller 7.

The operation of the FEC classifying unit 16 and the routing engine 17 will be described. The FEC classifying unit 16 receives the IP header, the TCP/UDP header, and the sequence number from the header controller 7, when the source address field within the IP header and the source port field within the TCP header, for example, have each specified value (the FEC classifying condition is matched), it judges whether the MPLS should be performed on the IP packet or not and it determines an output channel information pointer. When they have no specified values, it determines a dummy output channel information pointer. The output channel information pointer decided here is used as the address for the label processing unit 9 fetching the output channel information from the header and the like storing memory 15 similarly to the case of the above-mentioned MPLS. After completion of the processing, the FEC classifying unit 16 sends the output channel information pointer, the MPLS information, the match information, the shim header length, and the sequence number to the merge unit 18. Here, the merge unit 18 performs a sending control by means of a receive-enabling signal on the FEC classifying unit 16.

The routing engine 17 receives the sequence number and the IP header from the header controller 7, searches the routing table from the destination address within the IP header, so to get the output channel information (different from the output channel information pointer, the output channel information itself used by the switch 4, which is used when an active output channel information pointer is not decided in the FEC classifying unit 16) and send it to the merge unit 18 together with the sequence number. The merge unit 18 performs a sending control by means of a receive-enabling signal on the routing engine 17. The output channel information obtained here is to be obtained by the IP routing processing and it is to be used for the case of being unable to obtain any output channel information pointer with no matched condition in the FEC classifying unit 16.

Figure 14:
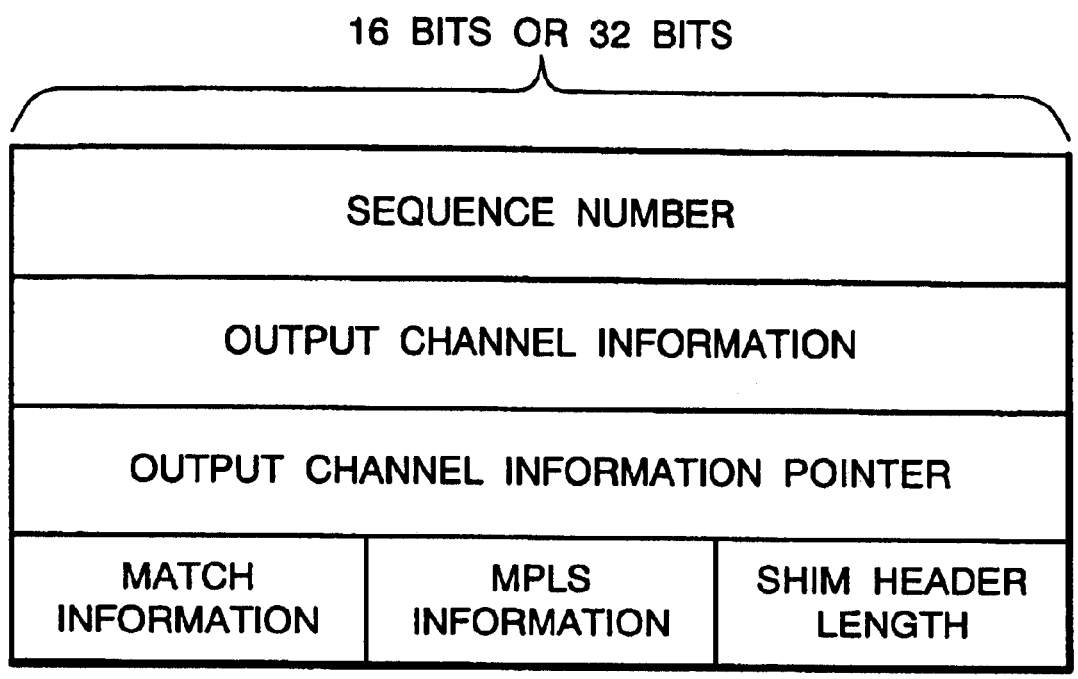
FIG. 14 is a view showing the format of the data to be supplied to the label processing unit by a merge unit.

The merge unit 18 simply merges the FEC classifying unit 16 with the information of the routing engine 17 (merges only when confirming the coincidence of the sequence numbers of the both information) and sends the merge result to the label processing unit 9. FIG. 14 shows the format of the information to be sent. The label processing unit 9 performs a sending control by means of a receive-enabling signal on the merge unit 18.

Figure 15:
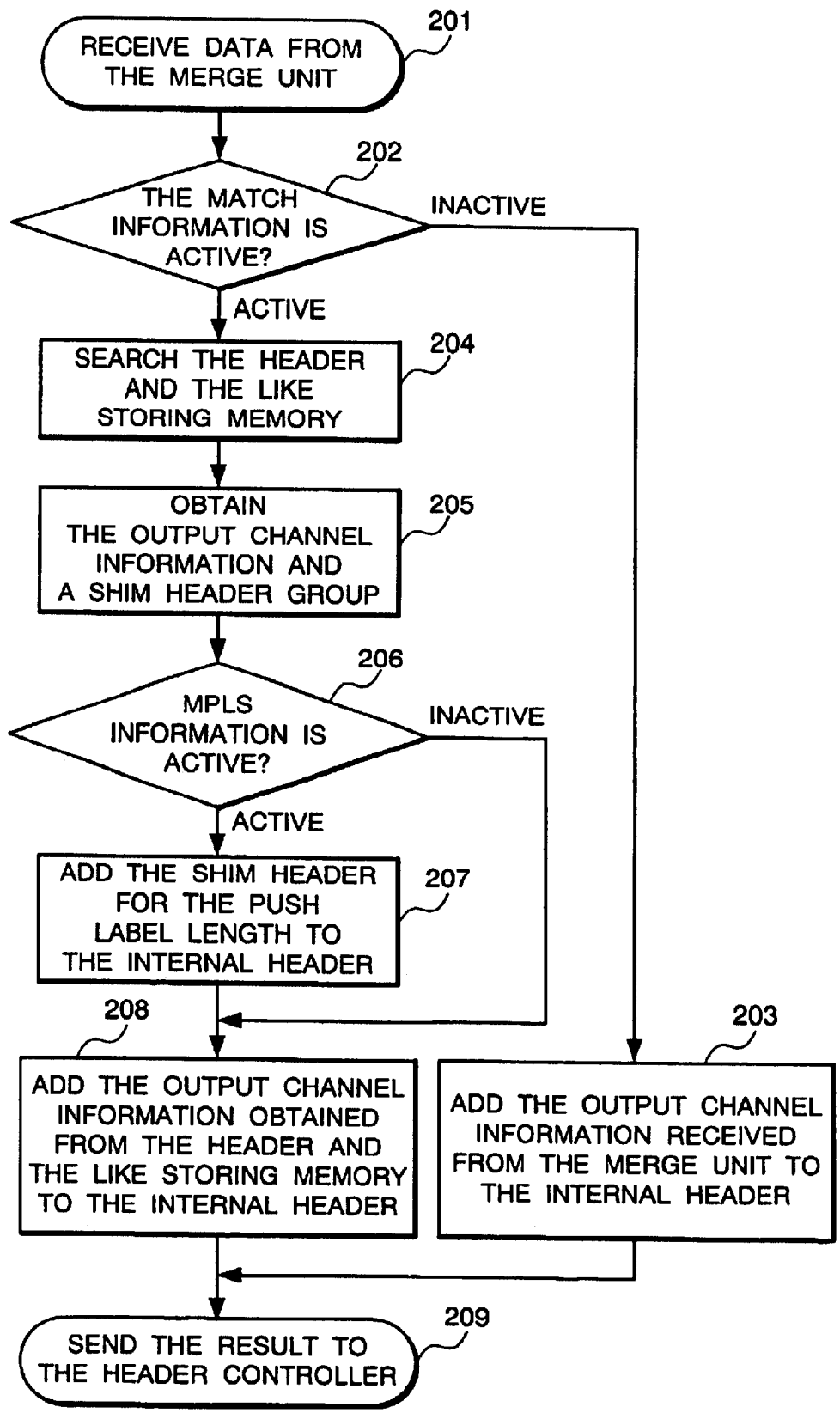
FIG. 15 is a flow chart of the IP packet processing of the label processing unit.

FIG. 15 shows the operation of the label processing unit 9 toward an IP packet. If the match information within the information received from the merge unit 18 (FIG. 14) is active, the label processing unit 9 gains access to the header and the like storing memory 15 by use of the output channel information pointer, so to get the output channel information used in the switch 4 and the shim header group to be pushed on the packets in the same way as that of the above-mentioned MPLS packet processing (201, 202, 204, 205). Further, when the MPLS information is active, it creates the shim headers for the number written in the shim header length information as the internal held header (206, 207). If no push bit flag stands, it adds nothing and neglects the obtained shim header group data. Thereafter, it adds the output channel information obtained from the header and the like storing memory 15 to the internal header (208), in spite of the MPLS information. If the match information is null, it adds only the output channel information received from the merge unit 18 to the internal header (203) without accessing to the header and the like storing memory 15, and sends the result to the header controller (209). Although this data format is the same as that in the case of the MPLS of FIG. 13, the shim headers 19 are made all 0 or all 1. A push bit of the label operation information field is made active by the label processing unit 9. After completion of the processing, the result is passed to the header controller 7. The header controller 7 performs a sending control by means of a receive-enabling signal on the label processing unit 9.

Figure 16:
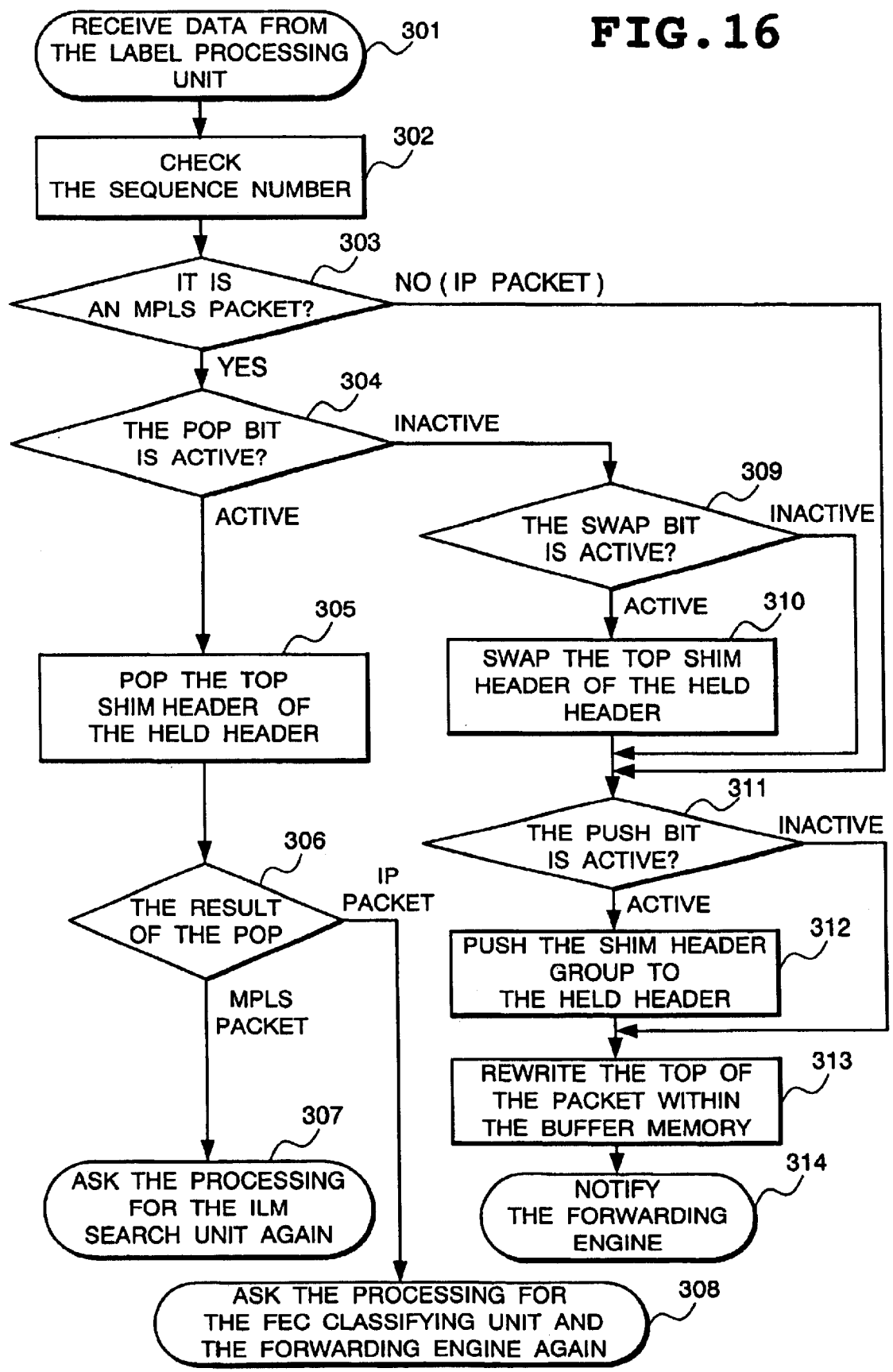
FIG. 16 is a flow chart of the header controller showing the processing of receiving various data from the label processing unit to the processing of asking a forwarding engine to send the data to a switch of the packet.

This time, the operation to be performed after completion of the processing in the label processing unit 9, which is common for both MPLS packet and the IP packet, will be described. FIG. 16 is a view relative to the operation of the header controller 7. The header controller 7 makes reference to the sequence number (301, 302) as for the data received from the label processing unit 9 (FIG. 13), and if the corresponding packet is an MPLS packet, it refers to the pop bit of the label operation information (303, 304). When the pop processing is required, the shim header at the head, of the header data being held is popped (305). As the result, if the remaining header data is the MPLS header, it sends the header data to the ILM search unit 8 in order to ask for its processing, and if it is the IP data, it sends the header data to the FEC classifying unit 16 and the routing engine 17 again in order to ask for its processing (306, 307, 308). At this time, if the processing may compete with the sending processing of the packet header newly received from the buffer controller 5, priority is given to the sending processing of the popped data. As for a packet judged to be subjected to no pop processing in 304, continuously a swap bit is checked (309), and as for a packet subjected to swapping (in the NHLFE search unit 13), the label of the head shim header within the held header data is swapped with a new label (310). This time, a push bit is checked (311). The IP packet that branched in 303 is subjected to this processing similarly to the MPLS packet (311). When the push bit is active, it adds the shim header group (in the MPLS specification, a plurality of shim headers can be pushed at once) to the top of the held header data (312). In these ways, the processing of the internal held header data within the header controller 7 has been completed. Namely, a series of pipeline processing for one packet is completed when the processing other than the pop processing is performed.

When completing all the header processing, the header controller 7 rewrites the updated internal held header on the head portion of the corresponding packet within the buffer memory 6 (313). This is to be performed by using the head address of the buffer received from the buffer controller 5 at first. The header controller 7 notifies the sequence number of the packet having been processed to the forwarding engine 10 (314).

Upon receipt of the notification, the forwarding engine 10 reads out a packet from the buffer memory 6 by using the pointer information corresponding to the sequence number and transfers the packet toward the switch 4. The position (pointer information) where the packet corresponding to the sequence number is stored in the buffer memory 6 is to be previously received from the buffer controller 5.

Upon completion of transferring the packet to the switch 4, it notifies the sequence number of the packet to the buffer controller 5. The buffer controller 5 releases the buffer memory used by the packet corresponding to the received sequence number and adds it to the non-used buffer list. In the above, a series of packet processing has been completed.

In a series of the processing, the header controller 7 holds the sequence numbers and the headers of the packet group under the pipeline processing, and the number of the headers that can be held there is previously set at a fixed value that is a maximum threshold. The number of the held headers is incremented when the header controller 7 receives the header from the buffer controller 5 and decremented when it instructs the forwarding engine 10 to send the packet. In some cases, the number of the held headers may be increased, beyond the threshold, when the pop processing frequently occurs. At this time, by making inactive a header receive-enabling signal being sent to the buffer controller 5, it can stop receiving a new header from the buffer controller 5.

In this case, though the buffer controller 5 holds the header information until the enabling signal from the header controller 7 becomes active, it abandons new packets received from a plurality of lines 2 without writing them into the buffer memory 6 when no vacant space is left in the header memory storing area within the buffer controller 5. Since the sending intervals of the header data sent from the header controller 7 to the ILM search unit 8 is determined depending on the maximum time, of each processing time of the ILM search unit 8, the FEC classifying unit 16, and the routing engine 17, by the pipeline processing, the time is shorter than in the method in which the next packet is not processed until all the processing of one packet is completed. Therefore, abandonment of the packets hardly occurs.

Although the embodiment with the present invention adopted to the LSR (Label Switch Router) has been described in the above, it is needless to say that the present invention may be similarly adopted to a packet exchange other than the router.

As mentioned above, when receiving a plurality of packets to be subjected to two and more pop processing, the present invention can reduce a possibility of abandoning a packet arriving at later. This is because the header processing is performed by the pipeline processing and a plurality of headers are processed at once; and because, when the pop processing occurs in the label processing of the MPLS packet, by looping the pipeline processing, the waiting time of the packet arriving at later becomes substantially equal to the processing time of the block requiring the maximum processing time, of each block positioned in the process of the pipeline processing, and it is shorter than the waiting time in the method of processing a plurality of pop processing at once (requiring every whole packet processing for the number of times of pop processing).

Secondly, the memory amount for realizing the ILM becomes 1/16 and less, for example, in the case of a line card holding 16 lines, compared with the case of gaining direct access to the memory with the label and input line as the ILM search key. This is because the ILM search key is divided into a plurality of keys and the ILM is searched by using the plurality of keys divided. Further, this is because the number of the search keys divided and the bit width of each divided search key can be changed depending on the number of the input lines and by a policy of a designer.

Thirdly, both the MPLS and IP processing can be efficiently integrated. This is because the header processing is performed by the pipeline processing, which is divided into two kinds of the processing for the MPLS and for the IP, both the pipeline processing join in the label processing unit, and the processing results of the both pipelines are represented in the same format and processed by the header controller.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A router for performing transfer processing based on a label of a header added to a protocol packet having the header that can be stacked with a plurality of layers, comprising:

a pipeline for performing in a conveyor-belt style the processing of obtaining necessary information for performing the operation after judging the type of an operation to be performed on a label and obtaining output channel information, based on the content of a packet and information set in advance, and a means of sequentially supplying a top header of each packet received from a line to said pipeline, performing an actual operation on the top header of each packet, based on the obtained necessary information and obtained output channel information, and as a result of pop processing, repeating the above processing starting from a stage of supplying a new top header to said pipeline as for a packet including the new top header, wherein said pipeline obtains necessary information for performing the operation by reference to a header processing table including a first table describing which kind of operation to be performed on a label and a second table for searching for a pointer of a corresponding entry of the first table, wherein said pipeline includes a means for searching the second table by a search key, which is defined by combining an input line number that has received a packet with a label within a top header, and wherein said searching means is constituted in that: the search key is divided into n divided search keys from a first divided search key to n-th divided search key; the second table is divided into a plurality of search tables from a first search table to n-th search table; the first divided search key is used for searching the first search table; a result obtained by searching the first search table is used as an upper key of a search key for searching the second search table, the second divided search key is used as a lower key, and a combined key of the upper key and the lower key is used as a key for searching the second search table; a result obtained by searching the (k−1)-th (k is an integer from one to n) search table is used as an upper key for searching the k-th search table, the k-th divided search key is used as a lower key, and a combined key of the upper key and the lower key is used for searching the k-th search table; and a result obtained by searching the n-th search table becomes a pointer for gaining access to the first table.

2. A router for performing transfer processing of a first protocol packet, based on a label of a first header added to the first protocol packet having the first header that can be stacked with a plurality of layers, as well as performing transfer processing of a second protocol packet, based on a label of a second header added to the second protocol packet having the second header that can be stacked with a plurality of layers, comprising:

a first pipeline for performing in a conveyor-belt style, the processing of obtaining necessary information for performing the operation after judging the type of an operation to be performed on a label and obtaining output channel information, based on the content of the first header and information previously set, and hence supplying a processed result in a predetermined format, a second pipeline for performing in a conveyor-belt style, the processing of obtaining necessary information for performing the operation after judging whether the second protocol packet needs to be changed into the first protocol packet or not, based on the content of the second header and information previously set and obtaining output channel information, and hence supplying a processed result in the predetermined format, and a means of judging the protocol of a packet received from a plurality of lines, sequentially supplying a top header of each packet received from the lines to said first pipeline if the packet is of the first protocol, performing an actual operation on the top header of each packet based on the obtained necessary information and obtained output channel information, and as a result of pop operation, repeating the above processing starting from a stage of supplying a new top header to said first pipeline from a packet including the new top header, while if the packet is of the second protocol, sequentially supplying the header of each packet received from the lines to said second pipeline and performing an actual operation on each packet based on the obtained necessary information and obtained output channel information.

3. A router as set forth in claim 2, in which the first protocol packet MPLS packet, the first header is a shim header, the second protocol packet is an IP packet, and the second header is an IP header and a TCP/UDP header.

4. A packet exchange for performing transfer processing based on a label of a header added to a protocol packet having the header that can be stacked with a plurality of layers, comprising:

a pipeline for performing in a conveyor-belt style, the processing of obtaining necessary information for performing the operation after judging the type of an operation to be performed on a label and obtaining output channel information, based on the content of the header of a packet and information set in advance, and a means of sequentially supplying a top header of each packet received from a line to said pipeline, performing an actual operation on the top header of each packet, based on the obtained necessary information and obtained output channel information, and as a result of pop processing, repeating the above processing starting from a stage of supplying a new top header to said pipeline, from a packet including the new top header, wherein said pipeline obtains necessary information for performing the operation by reference to a header processing table including a first table describing which kind of operation to be performed on a label and a second table for searching for a pointer of a corresponding entry of the first table, wherein said pipeline includes a means for searching the second table by a search key, which is defined by combining an input line number that has received a packet with a label within a top header, and wherein said searching means is constituted in that: the search key is divided into n divided search keys from a first divided search key to n-th divided search key; the second table is divided into a plurality of search tables from a first search table to n-th search table; first divided search key is used for searching the first search table; a result obtained by searching the first search table is used as an upper key of a search key for searching the second search table, the second divided search key is used as a lower key, and a combined key of the upper key and the lower key is used as a key for searching the second search table; a result obtained by searching the (k−1)-th (k is an integer from one to n) search table is used as an upper key for searching the k-th search table, the k-th divided search key is used as a lower key, and a combined key of the upper key and the lower key is used for searching the k-th search table; and a result obtained by searching the n-th search table becomes a pointer for gaining access to the first table.

5. A packet exchange for performing transfer processing of a first protocol packet, based on a label of a first header added to the first protocol packet having the first header that can be stacked with a plurality of layers, as well as performing transfer processing of a second protocol packet, based on a label of a second header added to the second protocol packet having the second header that can be stacked with a plurality of layers, comprising:

a first pipeline for performing in a conveyor-belt style, the processing of obtaining necessary information for performing the operation after judging the type of an operation to be performed on a label and obtaining output channel information, based on the content of the first header and information previously set, and hence supplying a processed result in a predetermined format, a second pipeline for performing in a conveyor-belt style, the processing of obtaining necessary information for performing the operation after judging whether the second protocol packet needs to be changed into the first protocol packet or not, based on the content of the second header and information previously set and obtaining output channel information, and hence supplying a processed result in the predetermined format, and a means of judging the protocol of a packet received from a plurality of lines, sequentially supplying a top header of each packet received from the lines to said first pipeline if the packet is of the first protocol, performing an actual operation on the top header of each packet based on the obtained necessary information and obtained output channel information, and as a result of pop operation, repeating the above processing starting from a stage of supplying a new top header to said first pipeline, from a packet including the new top header, while if the packet is of the second protocol, sequentially supplying the header of each packet received from the lines to said second pipeline and performing an actual operation on each packet based on the obtained necessary information and obtained output channel information.

6. A packet exchange as set forth in claim 5, in which the first protocol packet is an MPLS packet, the first header is a shim header, the second protocol packet is an IP packet, and the second header is an IP header and a TCP/UDP header.

7. An input racket processing method in a packet exchange or a router for performing transfer processing based on a label of a header added to a protocol packet having the header that can be stacked with a plurality of layers, comprising the steps of:

a pipeline processing step of performing in a conveyor-belt style, the processing of obtaining necessary information for performing the operation after judging the type of an operation to be performed on a label and obtaining output channel information, based on the content of the header of a packet and information set in advance, and a step of sequentially supplying a top header of each packet received from a line to said pipeline, performing an actual operation on the top header of each packet, based on the obtained necessary information and obtained output channel information, and as a result of pop processing, repeating the above processing starting from a stage of supplying a new top header to said pipeline, from a packet including the new top header, wherein said pipeline processing step including a step of obtaining necessary information for performing the operation by reference to a header processing table including a first table describing which kind of operation to be performed on a label and a second table for searching for a pointer of a corresponding entry of the first table, and wherein said pipeline processing step being formed by a step of searching the second table by a search key, which is defined by combining an input line number that has received a packet with a label within a top header; dividing the search key into n divided search keys from a first divided search key to n-th divided search key; dividing the second table into a plurality of search tables from a first search table to n-th search table; using the first divided search key for searching the first search table; using a result obtained by searching the first search table, as an upper key of a search key for searching the second search table, using the second divided search key as a lower key, and using a combined key of the upper key and the lower key as a key for searching the second search table; using a result obtained by searching the (k−1)-th (k is an integer from one to n) search table as an upper key for searching the k-th search table, using the k-th divided search key as a lower key, and using a combined key of the upper key and the lower key for searching the k-th search table; and thereby making a result obtained by searching the n-th search table as a pointer for gaining access to the first table.

8. An input packet processing method in a packet exchange or a router for performing transfer processing of a first protocol packet, based on a label of a first header added to the first protocol packet having the first header that can be stacked with a plurality of layers, as well as performing transfer processing of a second protocol packet, based on a label of a second header added to the second protocol packet having the second header that can be stacked with a plurality of layers, comprising the steps of:

a first pipeline processing step of performing in a conveyor-belt style, the processing of obtaining necessary information for performing the operation after judging the type of an operation to be performed on a label and obtaining output channel information, based on the content of the first header and information previously set, and hence supplying a processed result in a predetermined format, a second pipeline processing step of performing in a conveyor-belt style, the processing of obtaining necessary information for performing the operation after judging whether the second protocol packet needs to be changed into the first protocol packet or not, based on the content of the second header and information previously set and obtaining output channel information, and hence supplying a processed result in the predetermined format, and a step of judging the protocol of a packet received from a plurality of lines, sequentially supplying a top header of each packet received from the lines to said first pipeline if the packet is of the first protocol, performing an actual operation on the top header of each packet based on the obtained necessary information and obtained output channel information, and as a result of pop operation, repeating the above processing starting from a stage of supplying a new top header to said first pipeline from a packet including the new top header, while if the packet is of the second protocol, sequentially supplying the header of each packet received from the lines to said second pipeline and performing an actual operation on each packet based on the obtained necessary information and obtained output channel information.

9. An input packet processing method in a packet exchange or a router as set forth in claim 8, in which
the first protocol packet is an MPLS packet, the first header is a shim header, the second protocol packet is an IP packet, and the second header is an IP header and a TCP/UDP header.

* * * * *